No. 872,437. PATENTED DEC. 3, 1907.
C. E. LEONARD.
FILTER.
APPLICATION FILED AUG. 26, 1907.

Witnesses:—

Inventor,
Caleb E. Leonard.
his Attys.

UNITED STATES PATENT OFFICE.

CALEB E. LEONARD, OF LOS ANGELES, CALIFORNIA.

FILTER.

No. 872,437.  Specification of Letters Patent.  Patented Dec. 3, 1907.

Application filed August 26, 1907. Serial No. 390,231.

*To all whom it may concern:*

Be it known that I, CALEB E. LEONARD, a citizen of the United States, residing at Los Angeles, county of Los Angeles, and State of California, have invented a new and useful Filter, of which the following is a specification.

This invention relates to a filter which is adapted to be readily connected to the water-supply pipe of a house and which will act as a filter and also dispense with the necessity of a pressure regulator, a further object being to furnish water under either high pressure or low pressure, as may be desired. A further object is to provide easy means for clearing the filter.

Figure 1:
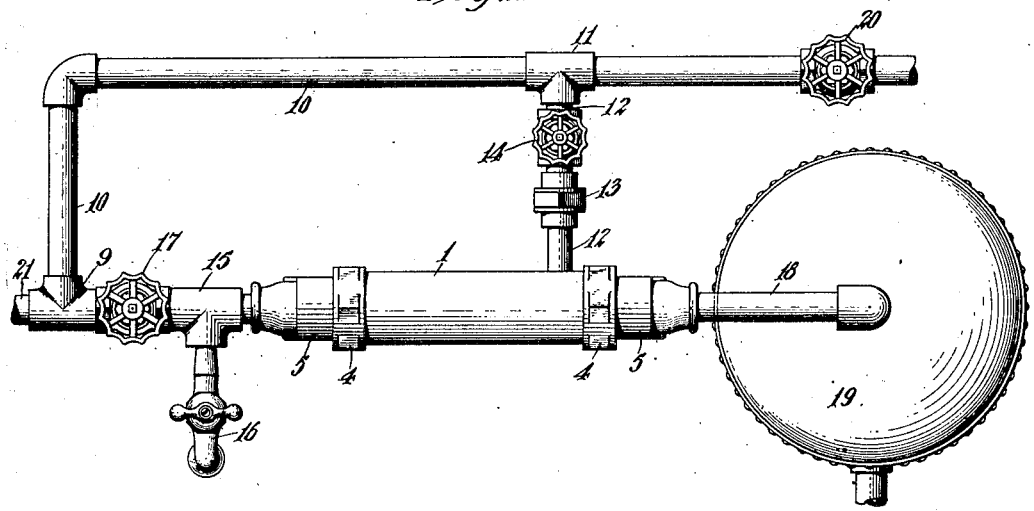
Figure 2:
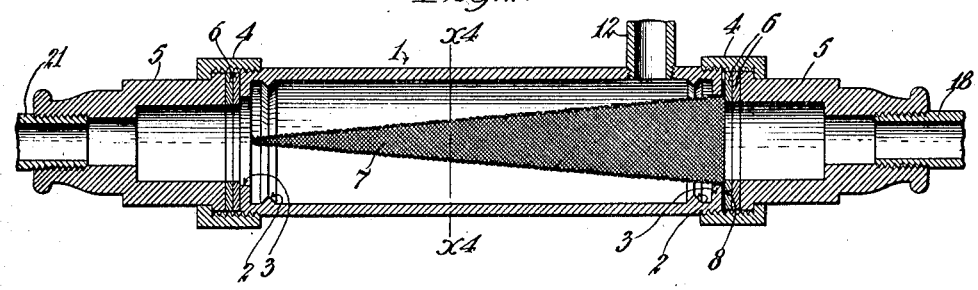
Figure 3:
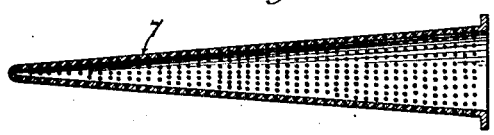
Figure 4:
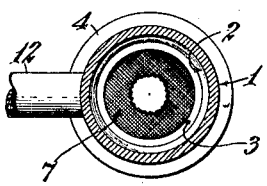

The accompanying drawings illustrate the invention and referring thereto:—Figure 1 is a plan view of the filter and associated connections. Fig. 2 is an enlarged sectional view taken longitudinally through the filter barrel. Fig. 3 is a longitudinal section through a modified form of filter cone. Fig. 4 is a section on line $x^4$—$x^4$ of Fig. 2.

1 designates a filter barrel which is formed near each end with two internal flanges, 2 and 3. Secured to each end of the barrel 1 by means of a union 4 is a reducer 5, there being two washers 6 arranged between the end of each reducer 5 and the outer flange 3 of the barrel 1. Arranged within the barrel 1 is a filter cone 7 the larger end of which has a flange 8 which is clamped between the inner washer 6 and the adjacent flange 3 of the barrel, and the filter cone 7 is thus supported in position concentrically within the barrel 1. The cone 7 extends through the entire length of the barrel and may be formed of a wire screen as shown in Fig. 2, or as shown in Fig. 3, might comprise a wax or cement cone having perforations. A pipe 21 is connected to the reducer 5 and forms the inlet, being arranged to introduce water into the end of barrel 1 at the small end of the cone. A tee 9 is connected with the pipe 21 and a branch pipe 10 extends laterally from the tee and then parallel with the barrel 1. Pipe 10 has a tee 11, and a pipe 12 formed in two sections, connects tee 11 with barrel 1, the two sections of pipe 12 being joined by a union 13, there being a valve 14 in the section 12 between the union 13 and tee 11. The pipe 21 adjacent the reducer 5 is provided with a tee 15, to which is connected a faucet 16, valve 17 being arranged between tees 9 and 15. At the other end of the barrel a pipe 18 leads from the reducer 5 to a charcoal tank 19. A valve 20 is arranged in pipe 10 beyond the tee 11.

In operation water enters through pipe 21, valve 17 being open, and valves 14 and 20 closed. The water passes through the reducer 5 into the barrel 1 and percolates through the filter cone 7, the meshes of the latter arresting the impurities which thus accumulate in the barrel 1. The water after passing through the meshes of the filter cone 7 and being purified, passes into the reducer 5 at the large end of the cone and thence through pipe 18 into tank 19, from which the water may be drawn out as required for use. In its passage through this circuit the pressure of the water is obviously reduced. When it is desired to use the water direct without filtering and under high pressure, for example, as in case of fire, valves 17 and 14 are closed and valve 20 is opened and the water then passes directly from the pipe 21 into pipe 10 and thence out past the valve 20. When it is desired to remove the filter of impurities which accumulate in the barrel 1, valves 17 and 20 are closed and valve 14 and faucet 16 are opened, whereupon the water passes from pipe 21 into pipe 10 through pipe 12 into the barrel 1 near the large end of the cone 7 and flowing to the left carries with it the sediment from barrel 1 into reducer 5, and thence out through faucet 16. In this manner the filter may be very quickly cleared of the impurities which have accumulated. Access may readily be had to the filter cone at any time by merely unscrewing unions 4 and 13. This permits the barrel 1 and cone 7 to be withdrawn without disturbing any of the other connections, and cone 7 may then be easily taken out of the barrel 1. Replacement is effected with equal facility.

What I claim is:—

In a filter, a filtering barrel, an inlet pipe at one end thereof, an outlet pipe at the other end thereof, unions connecting the barrel with said inlet and outlet pipes, a filter cone within said barrel and having a flange clamped between the outlet end of the barrel and the adjacent union, a pipe 10 connected to the inlet pipe, a pipe 12 connecting the pipe 10 with the filter barrel near the outlet end of the filter barrel, a valve in pipe 12, a valve 17 in the inlet pipe between pipe 10 and the filter barrel, a valve 16 connected to the inlet pipe between valve 17 and the filter barrel, and a valve 20 in pipe 10.

In testimony whereof, I have hereunto set my hand at Los Angeles, California, this 20th day of August 1907.

CALEB E. LEONARD.

In presence of—
GEORGE T. HACKLEY,
FRANK L. A. GRAHAM.